B. M. MATHIAS.
ROD SPLICING CLAMP.
APPLICATION FILED DEC. 26, 1916. RENEWED JUNE 3, 1918.
1,338,746.
Patented May 4, 1920.
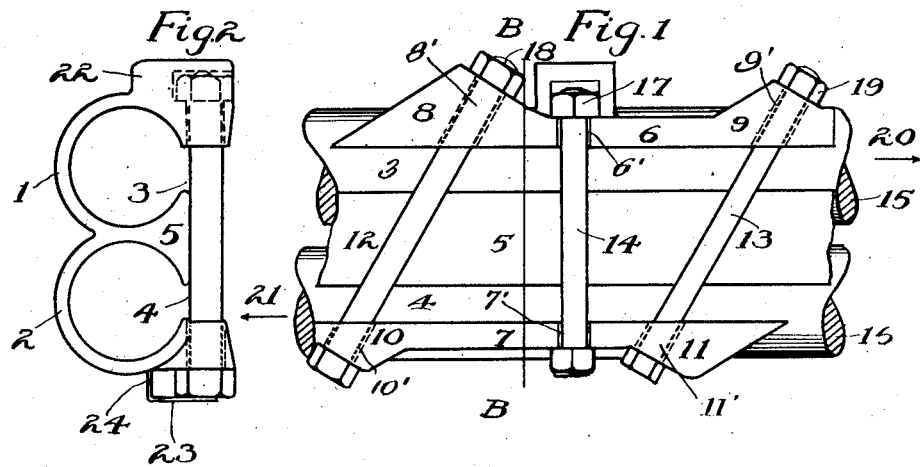
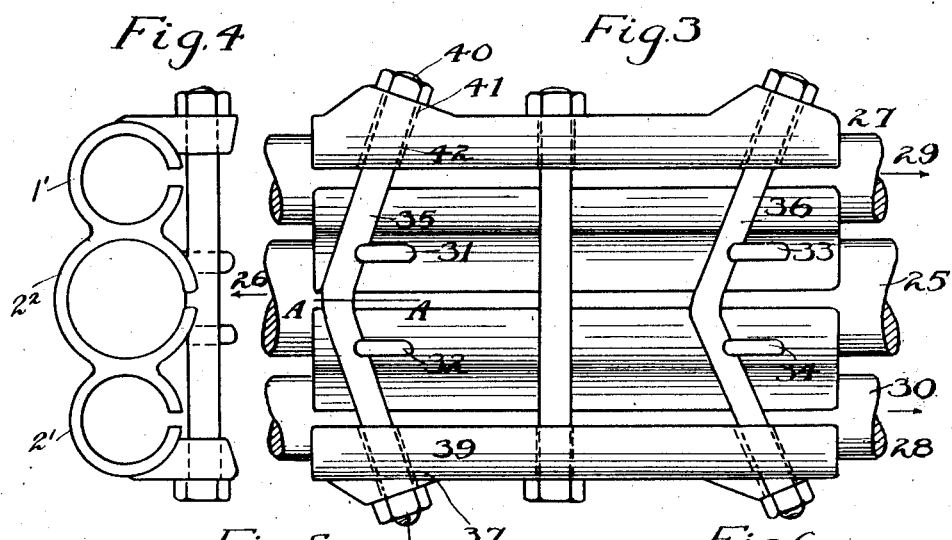
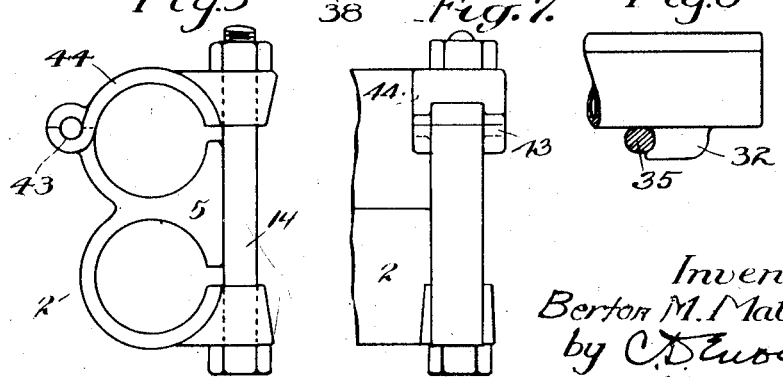
Inventor:
Berton M. Mathias

UNITED STATES PATENT OFFICE.

BERTON M. MATHIAS, OF MINNEAPOLIS, MINNESOTA.

ROD-SPLICING CLAMP.

1,338,746.     Specification of Letters Patent.     Patented May 4, 1920.

Application filed December 26, 1916, Serial No. 139,052. Renewed June 3, 1918. Serial No. 238,043.

*To all whom it may concern:*

Be it known that I, BERTON M. MATHIAS, a citizen of the United States, and a resident of Minneapolis, in the county of Hennepin and State of Minnesota, have invented certain new and useful Improvements in Rod-Splicing Clamps, of which the following is a specification.

One object of my invention is to provide in a rod splicing clamp contractible means for clamping two or more rods.

Another object of my invention is to provide in a rod splicing clamp contractible means for clamping rods together and means for taking up the longitudinal stress in the clamp.

Another object of my invention is to provide in a rod splicing clamp having contractible means for clamping rods, means for expanding the contractible means when removing the clamp.

With these and incidental objects in view, the invention consists of certain novel features of construction and combinations of parts, the essential elements of which are hereinafter described with reference to the drawing which accompanies and forms a part of this specification.

In the drawing Figure 1 is a side elevation of my improved clamp applied to a pair of rods, and Fig. 2 is a section taken on the line B B Fig. 1.

Fig. 3 is a side elevation of a modification of my improved clamp adapted for splicing together 3 rods, and Fig. 4 is an end view of the same.

Fig. 5 is an end view of a modification of my clamp and Fig. 6 is a sectional detail taken on the line A A Fig. 3.

Fig. 7 is a side elevation of a portion of the bolt viewed in the opposite direction from that shown in Fig. 3.

The clamp comprises two cylindrical portions 1 and 2, Fig. 2, having open slots 3 and 4 respectively extending longitudinally thereof and a central rib 5 of substantially triangular section lying between the cylindrical portions as plainly shown in Figs. 1 and 2.

Stiffening ribs 6 and 7 extend longitudinally along the cylindrical portions and carry at the ends thereof bosses 8 and 9, and 10 and 11 respectively. The bosses have apertures provided therein and extending at a transverse angle to receive the bolts 12 and 13, while the central portion of the ribs 6 and 7 have slots therein to receive the bolt 14.

It is apparent that if rods 15 and 16 are positioned in the clamp as shown in Fig. 1, and the bolt 14 is screwed into nut 17, the cylindrical members 1 and 2 will be constricted and tightly clamp the rods 15 and 16 respectively.

With the nut 17 drawn up snugly, the nuts 18 and 19 are then drawn tightly against the bosses 8 and 9 respectively thereby incidentally increasing the clamping effect and also providing a longitudinal stress component to oppose the longitudinal stress that may be set up in the rods 15 and 16 in the direction of the arrows, 20 and 21.

To facilitate the removal of the clamps from the rods 15 and 16, I provide a cap 22 which extends over the nut 17, and also provide a strap 23 which is preferably cast into the rib 7 at 24, and which may be forcibly bent down over the end of the bolt 14 after the bolt is pushed in the clamp, as shown in Fig. 2.

With the strap 23 so bent over the bolt head, it is evident that if the bolt is turned to withdraw it from the nut which is held from turning by the cap 22, pressure will be exerted by the bolt between the cap 22 and the strap 23, and thus spread apart the contracted cylindrical portions 1 and 2.

In Figs. 3 and 4 is shown a modification of my clamp adapted to clamp together a rod 25 having a strain set up therein in the direction of the arrow 26, and two rods 27 and 28 having strains set up therein in the direction of the arrows 29 and 30.

The construction in general is the same as that shown in Figs. 1 and 2, but as this clamp is designed to clamp together three rods a modification of the cylindrical contracting portions is necessary and I therefore provide a contractible portion 1' and a contractible portion 2', similar to the parts 1 and 2, Fig. 2, and a central contractible portion 2², likewise similar but preferably of larger diameter.

With this style of clamp I use in place of the bolts 12 and 13, bolts 35 and 36 formed as shown and held in position by the lugs 31 and 32 for the bolt 35, and lugs 33 and 34 for the bolt 36.

To insert the bent bolts 35 and 36, it is of course, necessary to have the apertures 37 in the lugs sufficiently large to allow the bolts being turned in order to place them in position.

Referring to bolt 35, and these bolts are in the nature of stay bolts or studs as they have no heads, the end 38 would be passed through the aperture 37 from the side 39, and the end 38 would be projected through the aperture sufficiently to allow the end 40 to be inserted through the aperture 41 at the end 42 and thus brought back into the position as shown in Fig. 3 with the bent portion of the bolt turned down under the lugs 31 and 32.

The bolts 35 and 36, restrained by the lugs 31 and 32, and 33 and 34, respectively, serve to clamp the contractible members 1', 2', and 2², onto the rods 27, 28 and 25 respectively, and also to set up a longitudinal stress to offset the longitudinal stress that may be set up in the rods 27, 28 and 25, instead of depending entirely on the friction between the rods and the contractible members.

In certain classes of work where it would be difficult to pass the second rod into the cylindrical portion by longitudinal movement, I form a hinge joint 43 Fig. 5 so that the bolt may be placed in position and the upper half 44 of the cylindrical portion swung back over the rod and the clamp then tightened up as already described.

While I have described my invention and illustrated it in several designs, I do not wish it understood that I limit myself to these constructions, as the application of my invention may be varied in many ways within the scope of the following claims:—

1. In a rod splicing clamp, the combination of a pair of substantially cylindrical contractible members joined together longitudinally, a stiffening rib forming a part of and positioned between the main body of said contractible members, an exterior stiffening rib running longitudinally of each of said contractible members, slots in each of said exterior ribs for passing therethrough a bolt having a head at one end and adapted to carry a nut on the other end by a screw connection, a cap partly surrounding the nut end of said bolt and a nut placed thereon and having interior dimensions to prevent the nut from turning, a strap carried by one of said contractible members and adapted to be bent down over the head end of said bolt after it is positioned in the slots in said exterior ribs.

2. In a rod splicing clamp, the combination of a pair of substantially cylindrical contractible members joined together longitudinally, ribs positioned along each of said contractible members, means for contracting said contractible members and diagonally positioned means connecting said exterior ribs for taking up longitudinal stress in the rod splicing clamp.

3. In a rod splicing clamp, the combination of multiple contractible members joined together longitudinally, bent stay bolts extending diagonally and transversely across said contractible members, bosses carried by each of the exterior of said multiple contractible members having apertures therein for passing therethrough said bolts, and means on one of said contractible members for positioning said bolts in a plane substantially parallel to the central plane of said multiple contractible members.

BERT M. MATHIAS.